Feb. 8, 1955 L. C. OSBORN 2,701,489
CAM-ACTUATED SLIDABLE JAW WRENCH
Filed Sept. 12, 1951
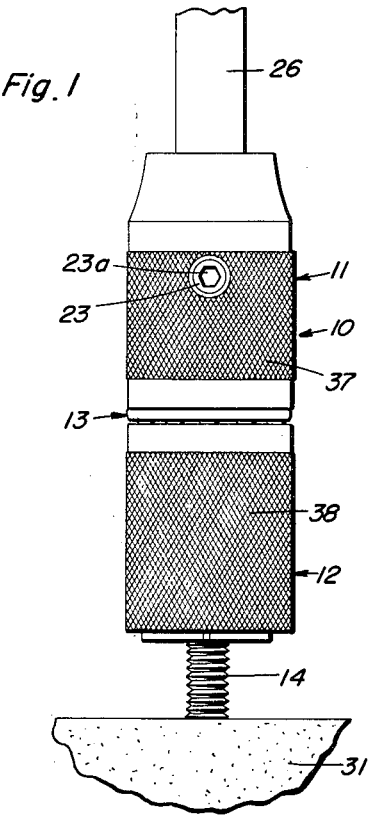
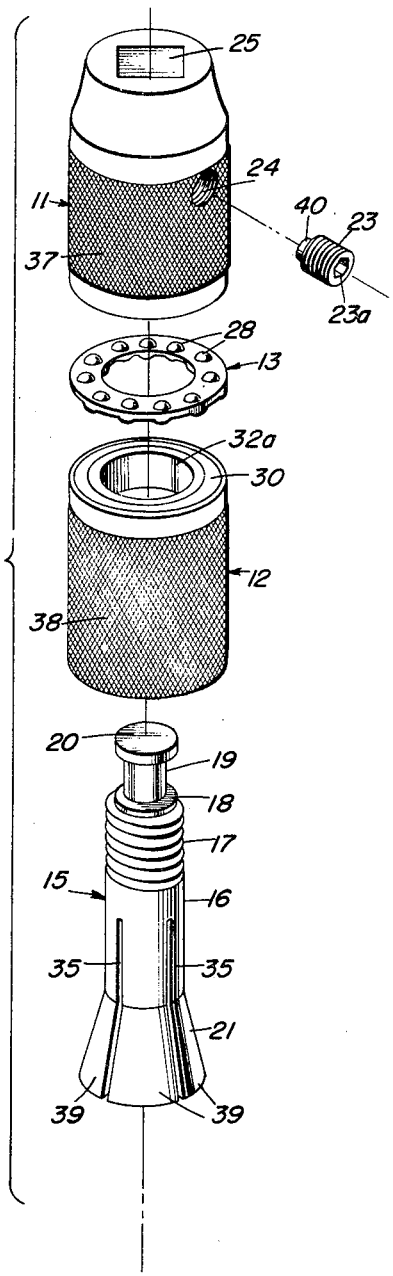
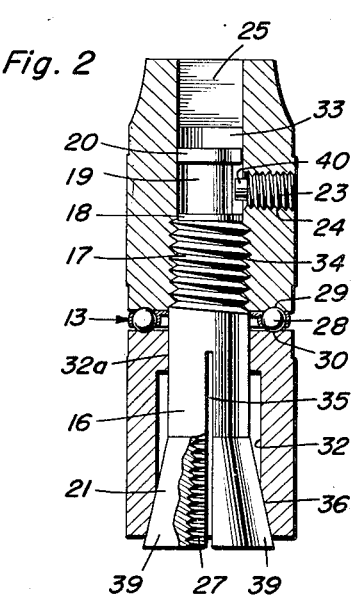
INVENTOR
Leonard C. Osborn
BY
ATTORNEY

United States Patent Office 2,701,489
Patented Feb. 8, 1955

2,701,489

CAM-ACTUATED SLIDABLE JAW WRENCH

Leonard C. Osborn, Salt Lake City, Utah

Application September 12, 1951, Serial No. 246,301

5 Claims. (Cl. 81—53)

This invention relates to chucks, and more especially to a chuck for grasping studs or other articles which are to be rotated by use of the same.

An object of the present invention is the provision of a simple, practical and reliable chuck which is readily operated to apply a positive grasping force to a stud, tool, or the like, for rotating the latter, and yet is easily disengaged when desired.

Another object is that of providing a chuck of the character indicated which may be closed under low friction operating conditions to exert a powerful grasping action, and which chuck is substantially free of binding and jamming when release of the stud or other article is initiated.

A further object of this invention is the provision of a strong and durable chuck which is capable of being opened and closed with minimum friction.

A still further object of this invention is the provision of a chuck of the character indicated which is easy to construct and assemble.

Other objects in part will be obvious and in part pointed out more fully hereinafter.

The invention accordingly consists in the several parts, their combination, and in the features of operation of the same, the scope of the application of which is set forth in the following claims.

In the accompanying drawing, representing an embodiment of the present invention:

Figure 1 is a vertical elevation of a rotary chuck and operating shaft for the same, with the chuck engaging a stud embedded in such embedding material as concrete;

Figure 2 is a longitudinal sectional elevation of the chuck; and

Figure 3 is an exploded view of the chuck represented in the other figures of the drawing.

Like reference characters denote like parts throughout the several figures of the drawing.

As conducive to a clearer understanding of certain features of the present invention, it may be noted at this point that rotary chucks are in considerable demand for a wide variety of uses, among which are the operation of tools such as of cutting, abrading, or machining varieties, or for articles other than tools such as studs which are to be driven or extracted. In certain instances there is need for chucks which serve to grip the projecting end of a stud which otherwise is embedded in concrete or other hard-setting material, to extract the stud from embedment. In this and other connections, it sometimes becomes the practice to utilize a power-operated machine of the rotary type to drive the chuck and the article grasped in the jaws of the chuck, the machine further being capable of supplying vibration to the chuck and accordingly the article grasped such as to loosen the article and thus enhance rotation of the same.

While a great variety of chucks are on the present day market, many of these do not lend themselves readily to production, assembly, or maintenance in good repair such as by replacement of parts as may occasionally be the need. There are other well known chucks which are not reliable in use for the reason of tending to bind or jam under load, thus making it difficult to free the article grasped. In other instances friction is a serious inhibitant to free operation of the chuck jaws for grasping the article to be operated upon, and in this respect the chucks introduce operational difficulties and delay.

A still further object of my invention accordingly is the provision of chucks for tools, studs, or the like, which chucks overcome many of the disadvantages in the prior art for such reasons as being easy to construct, operate and maintain.

Referring now more particularly to the embodiment of the invention represented in the accompanying drawing, there is provided a chuck denoted in general by the reference numeral 10. The chuck comprises a head 11, a cam sleeve 12, and a collet 15, the head and sleeve being separated at adjacent ends by an anti-friction bearing 13. Collet 15 has a substantially cylindrical shank 16 which at the outer end is integral with a frusto-conical extension 21 of the collet shank 16, the frusto-conical portion being coaxial with the shank 16 and having its conical surface increasing in diameter away from this shank to serve as a cam in a manner which hereinafter will be more fully described.

The inner end of shank 16, remote from the frustro-conical portion of the collet, includes longitudinally spaced annular stop portions 18 and 20 and a relatively small diameter portion 19 intermediate the stops and integral with the latter to afford an annular clear space between the stops. Helical threads 17 on shank 16 advance from the vicinity of stop 18 forward along the outside surface of the shank and terminate short of the frusto-conical portion 21 of the collet.

Collet 15 advantageously is made of metal such as tool steel and illustratively is produced by machining stock such as of cylindrical bar shape having a diameter at least equal to the maximum diameter desired in the frusto-conical portion 21. The major machining operations are for example achieved on a lathe or by milling, the frusto-conical end 21 thus being produced along with the integral shank 16 and portions 18, 19, and 20 of the shank. Threads 17 conveniently are cut in a threading device or by milling.

The article receiving end of collet 15 has a socket or recess 27 and threads in the wall of the same. Recess 27 for example is formed by axially boring the frusto-conical portion 21, and even the adjacent portion of shank 16 when desired, and the threads conveniently by tapping the wall of the bore. Collet 15 has a plurality of resilient jaws 39, these being segments of the frusto-conical portion 21 and of that portion of the shank 16 which is adjacent to the latter. The jaws 39 are separated by spaces 35, and the jaws conveniently are produced by longitudinally sawing the frusto-conical portion 21 and shank 16, such as on diameters which are at right angles to each other to produce kerfs 35 and form four jaws. As will be seen, collet 15 is useful for holding an end of such articles as stud bolts 14, for example to extract the latter from embedment in a concrete body 31.

The chuck head 11 conveniently is substantially cylindrical in shape having a knurled outside surface 37 and a rectangular opening 25 axially entering one end thereof. A rotary shaft 26 of a power-operated machine, or of a rotation applying device of the manually-operated type, has a rectangular end which fits the walls of opening 25 in the chuck head 11, thus to give a driving connection to the chuck. At opposite end, the chuck head 11 has a cylindrical axial bore 33, the walls of the bore being provided with threads 34 of a size and pitch corresponding to those of threads 17 on the shank of collet 15, to accommodate the latter threads in operative relation. Stops 18 and 20 of the collet shank are of a sufficiently small diameter to pass readily into the bore 33 with appreciable clearance. A set screw 23 having a tip 40 at the inner end thereof is threaded to engage threads in the wall of opening 24, which passes laterally through the chuck head 11. A socket 23a or the like in the outer end of the screw 23 receives a suitable driving tool for the screw so that the extent of projection into bore 33 may be altered. The tip 40 of the set screw, at innermost position of the screw relative to the chuck head wall, occupies a position in the annularly clear space between the portions 18 and 20 of the collet shank, thus to prevent escape of the collet 15 from the chuck head and yet allow rotation of the chuck head 11 and relative longitudinal movement of the head and collet when rotation occurs at threads 17 and 34. When tip 40 is backed out of bore 33 and the space between the annular portions 18 and 20 of the shank, collet 15 and chuck head 11 may be unscrewed on their threads 17 and 34 for separation, and with this same position of the screw 23, the parts may be re-assembled.

On the collet shank 16 and disposed between the frustro-conical end 21 of the collet and the proximate end of the chuck head 11 is a cam sleeve 12. This sleeve for example is cylindrical in shape and has the same outside diameter as the chuck head 11. The outside surface of the sleeve conveniently is knurled, this being represented at 38. Both the chuck head 11 and cam sleeve 12 extend from end-to-end of collet 15. This bore 33 has a conical wall 36 adjacent to the frustro-conical portion 21 of the collet 15, a cylindrical wall 32 leading inward from the conical wall 36, and for example a cylindrical wall 32a having a reduced diameter as compared with that of the wall 32. The bore wall 32a advantageously fits the shank 16 within close tolerances to guide longitudinal movement between the cam sleeve and collet. The conical bore wall 36 thus cooperates directly with the frustro-conical portion 21 of the collet to afford a longitudinal thrust bearing, this in conjunction with the bearing afforded between bore wall 32 of the cam sleeve and shank 16 of the collet. The minimum diameter of conical portion 36 of the bore wall is safely less than the maximum diameter of the frustro-conical portion 21 of the collet to prevent escape of the sleeve over the end of the collet when pressure is exerted longitudinally by the sleeve to compress the collet 39 radially. Longitudinal movement of the cam sleeve 12 against the collet head accordingly exerts a highly effective levering action on the ends of jaws 39. Wall 36 of the cam sleeve 12 preferably is of the same pitch as the frustro-conical portion 21 of the collet for smooth longitudinal sliding movement on jaws 39 and for transmitting the thrust of the sleeve to the jaws. By introducing a bore wall 32 of relatively large diameter as compared with the diameter of wall 32a an appreciable amount of the cam sleeve 11 is clear of the collet shank 16 and friction accordingly is reduced.

An anti-friction bearing 13 advantageously is disposed between the adjacent ends of the chuck head 11 and the cam sleeve 12. This bearing preferably is of the multiple ball type having an annular cage 22 in the form of a ring surrounding the shank 16 of the collet, the ring for example being slightly spaced on inside diameter from the outside surface of the shank to permit ready assembly of the chuck. Cage 22 has a plurality of annularly disposed sockets each accommodating a ball 28 as of steel and holding the same rotatably in place so that portions of the ball jut out on opposite sides of the cage for rolling contact respectively with the adjacent ends of the chuck head 11 and cam sleeve 12. The chuck head 11 and cam sleeve 12 advantageously have annular grooves 29 and 30 respectively in the adjacent end surfaces thereof to guide the jutting portions of the steel balls 28 in rolling contact with the walls of the grooves.

For assembling the chuck 10, cam sleeve 12 is placed over the threaded end 17 of collet 15, the bearing wall 32 then being moved to position around shank 16 of the collet and the conical wall 26 to longitudinal abutment against the frusto-conical portion 21. The anti-friction bearing 13 then is placed over the threaded end of the collet shank and the balls 28 are introduced in groove 30 of the cam sleeve 12. With the tip 40 of set screw 23 backed out of bore 33, the chuck head threads 34 are made to rotate on threads 17 of the collet shank until the annular grooves 29 and 30 receive balls 28 in rolling contact. Set screw 23 is then advanced through the wall of the chuck head until tip 40 thereof rests between the annular portions or stops 18 and 20, thus to prevent complete removal of the chuck head from the collet shank. It will thus be seen that the chuck 10 is easy to assemble. Also, it will be appreciated that the chuck is easily disassembled by backing out the set screw 23 and unthreading the chuck head 11 from the collet shank threads 17.

With the chuck 10 assembled it is possible to operate the collet jaws 39 to and from each other and accordingly to and from article grasping position. Rotation of the collet head 11 in one direction causes the head to advance on threads 17 of the collet thus pulling the collet jaws 39 farther in longitudinally with respect to the cam sleeve 12. The conical wall 36 of the cam sleeve accordingly comes to bear with greater force upon the collet jaws and urges them toward each other for gripping the article. At the same time, the advancement of the chuck head 11 on the collet shank threads 17 imposes a compression load on the antifriction balls 28, though these balls readily continue to rotate in the guide grooves 29 and 30. The thrust is transmitted through the balls 28 to the cam sleeve 12, urging the conical wall 36 of the latter against the frusto-conical end 21 of the collet and serving to move the jaws radially inward to grip the article. It will also be seen that the rotational force applied to the chuck 10 such as by means of the machine shaft 26 is effectively transmitted to the article gripped and is positively applied to prevent the article and collet jaws 39 from slipping with respect to each other.

In rotating articles or the like with chuck 10, such as for extracting studs 14 from embedment in concrete 31, or from other bodies, the collet shank threads 17 and the associated chuck head threads 34 are of the lefthand type where the article or stud requires lefthand rotation. Under these conditions, for example, lefthand rotation of the machine shaft 26 serves to increase the gripping action of the collet jaws on the stud 14 while the stud is being backed out or removed from the embedding body. Likewise, where the stud or other article requires righthand rotation, the threads 17 and 34 are of the righthand type. The wall of the article receiving bore or socket 27 may be smooth or of any suitable shape to enhance the gripping action of the collet jaws. In the particular embodiment represented, the wall of the bore or socket has threads in the surface thereof, such as to match those at the corresponding end of the stud 14 to be gripped. Chuck 10 is well suited for operation under conditions of vibration, such as in employing a rotary vibratory machine to power the shaft 26, the vibration being for such purposes as to assist in loosening stud 14 in the embedding body for extraction by rotation.

By virtue of the anti-friction bearing 13 between the adjacent ends of the chuck head 11 and the cam sleeve 12, it is but a simple matter to open the collet jaws for releasing the article which up to this point has been gripped. In this, the chuck head 11 is reversed in rotation on the collet shank threads 17 in favor of being backed off to relieve longitudinal thrust on the collet jaws 39. The resiliency of the jaws under relieved compression allows them to expand radially away from the article and thus release of the gripping action is achieved. The anti-friction balls 28 roll freely in contact with the chuck head 11 and cam sleeve 12 to prevent binding and jamming of the head and sleeve under thrust. Also, thrust is readily transmitted through the anti-friction bearing, there being but a small area of contact for friction.

Thus it will be seen that in this invention there is provided a rotary chuck in which the various objects noted herein together with many thoroughly practical advantages are successfully achieved. It will be seen that the chuck is easy to construct and assemble and that it is well suited for ease of operation and practical use.

As many possible embodiments of the invention may be made and as many changes may be made in the embodiment hereinbefore set forth, it will be understood that all matter described herein or shown in the accompanying drawing is to be interpreted as illustrative and not as a limitation.

I claim:

1. A chuck, comprising, in combination, a collet including a shank having radially movable jaws extending from one end thereof, threads on said shank, and said shank having an appreciably reduced end as compared with the outside diameter of said threads and extending away from said threads and movable jaws, and a stop portion of said reduced end also appreciably smaller in outside extent than the outside diameter of said threads and being adjacent to an annularly free depression between itself and said threads, a cam sleeve surrounding said collet jaws and movable longitudinally on said shank for pressing and relieving said jaws radially in accordance with the direction of longitudinal movement, a chuck head having a longitudinal bore receiving the reduced end of said shank and threads on the bore wall engaging the threads on said shank and rotatable in one direction to thrust said cam sleeve and collet longitudinally together for radially compressing the latter to article grasping position and in the opposite direction to relieve thrust on said cam sleeve and jaws for radial relief of the jaws, an adjustable detent on said chuck head to enter said annular depression in said collet shank for limiting the extent of longitudinal movement of said head on the collet shank threads and selectively to free said shank for removal of the collet from said chuck head, and an anti-friction bearing between adjacent ends of said chuck head and cam sleeve to support low-friction relative rotation of the same and to transmit the longitudinal thrust.

2. A chuck, comprising, in combination, a collet including a shank having threads along the length thereof, a stop on a reduced end of said shank, a cam member adjacent to said collet jaws and movable longitudinally of said shank for pressing and relieving said jaws radially in accordance with the direction of longitudinal movement, a chuck head having a longitudinal bore receiving said shank stop and threads on the bore wall engaging said threads on the shank and rotatable in one direction to thrust said cam member and collet longitudinally together for radially pressing the jaws of the latter to article-grasping position and in the opposite direction to relieve thrust on said cam member and jaws for radial relief of said jaws, a detent extending from said chuck head and cooperating with said stop for limiting the extent of longitudinal release movement and rotation of said chuck head on said collet shank, to prevent accidental separation of said head and shank, and an anti-friction bearing between adjacent ends of said chuck head and said cam member to support low-friction relative rotation of the same and to transmit said thrust.

3. A chuck, comprising, in combination, a collet including a shank having threads along the length thereof, a stop on a reduced end of said shank and radially movable jaw extensions at the opposite end of said shank, said jaws including substantially conical outer surfaces on rear sides adjacent to said shank, a longitudinally movable cam member slidable on said shank and having a conical bore wall abutting said conical surfaces of said jaws radially in accordance with the direction of longitudinal movement, a chuck head having a longitudinal bore receiving said shank stop and threads on the bore wall engaging said threads on the shank and rotatable in one direction to thrust said cam member and collet longitudinally together for radially pressing the jaws of the latter to article-grasping position and in the opposite direction to relieve thrust on said cam member and jaws for radial relief of said jaws, a detent extending from said chuck head and cooperating with said stop for limiting the extent of longitudinal release movement and rotation of said chuck head on said collet shank, to prevent accidental separation of said head and shank, and a ball race bearing between adjacent ends of said chuck head and cam sleeve to support low-friction relative rotation of the same and to transmit said thrust.

4. In a chuck for power machine operated articles, the combination which includes, a collet comprising a shank having threads, a chuck head having means for driven engagement with said power machine to rotate one of said articles with said chuck and having threads engaging said threads on the collet shank for rotary axial movement along said shank, radially movable jaws at one end of said shank and affording cam surfaces on rear sides adjacent to said shank, a cam member movable lengthwise of said shank between said chuck head and said cam surfaces for radially depressing and relieving said jaws in accordance with thrust applied to said cam member and relieved respectively by bodily rotation of said chuck head in opposite directions of rotation relative to said member, said thrust being applied to increase the depression of said collet jaws in one of said directions of rotation of said chuck head and the intensity thereof increasing with article load on said jaws to achieve a more powerful grip on the article, and an anti-friction bearing between said chuck head and cam member to support low-friction relative rotation of the same and to transmit said thrust and permit ready relief thereof.

5. In a chuck for power machine operated articles, the combination which includes, a collet comprising a shank having threads, a chuck head having means for driven engagement with said power machine to rotate one of said articles with said chuck and having threads engaging said threads on the collet shank for rotary axial movement along said shank, radially movable jaws at one end of said shank and affording cam surfaces on rear sides adjacent to said shank, a cam member having a thrust receiving portion in axial alignment with a thrust issuing portion of said chuck head, and said cam member being movable lengthwise of said shank between said chuck head and cam surfaces for radially depressing and relieving said jaws in accordance with thrust applied to said cam member and relieved respectively by bodily rotation of said chuck head in opposite directions of rotation relative to said member, said thrust being applied to increase the depression of said collet jaws in one of said directions of rotation of said chuck head and the intensity thereof increasing with article load on said jaws to achieve a more powerful grip on the article and an anti-friction bearing between the thrust issuing portion of said chuck head and the thrust receiving portion of the cam member, said bearing having an annular cage around said shank, and balls in said cage to support low-friction relative rotation of said chuck head and cam member and to transmit said thrust and permit ready relief thereof.

References Cited in the file of this patent

UNITED STATES PATENTS

| Number | Name | Date |
|---|---|---|
| 493,815 | Bingham | Mar. 21, 1893 |
| 968,858 | Kornberg | Aug. 30, 1910 |
| 1,789,601 | Sjogren | Jan. 20, 1931 |
| 1,807,265 | Walker | May 26, 1931 |
| 1,815,500 | Doan | July 21, 1931 |
| 1,817,049 | Weil | Aug. 4, 1931 |
| 2,216,557 | McKean | Oct. 1, 1940 |
| 2,220,654 | Kirkland | Nov. 5, 1940 |
| 2,293,176 | Sjogren | Aug. 18, 1942 |
| 2,337,400 | Maute | Dec. 21, 1943 |
| 2,438,797 | Bagge | Mar. 30, 1948 |
| 2,497,214 | Dreyer | Feb. 14, 1950 |
| 2,634,641 | Hodges | Apr. 14, 1953 |